US006400942B1

(12) United States Patent
Hansson et al.

(10) Patent No.: US 6,400,942 B1
(45) Date of Patent: Jun. 4, 2002

(54) METHOD AND SYSTEM FOR BROADCASTING LARGE SHORT MESSAGES (75) Inventors: Rolf Hansson, Kungsänen; Dick Andersson, Kista; Torgny Karlsson, Bromma; Jeremy Hamill-Keays, Sollentuna, all of (SE)

(73) Assignee: Telefonaktie Bolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/189,078

(22) Filed: Nov. 9, 1998

(51) Int. Cl.[7] .................................................. H04Q 7/22
(52) U.S. Cl. ...................... 455/426; 455/466; 455/515; 370/337; 370/347
(58) Field of Search ................................. 455/426, 466, 455/435, 515, 434, 31.2, 458; 370/347, 317, 329, 337

(56) References Cited

U.S. PATENT DOCUMENTS

| 5,036,518 A | | 7/1991 | Tseung | 371/32 |
|---|---|---|---|---|
| 5,138,615 A | * | 8/1992 | Lamport et al. | 370/400 |
| 5,224,150 A | | 6/1993 | Neustein | 379/57 |
| 5,278,890 A | * | 1/1994 | Beesson et al. | 379/57 |
| 5,353,328 A | | 10/1994 | Jokimies | 379/58 |
| 5,633,913 A | | 5/1997 | Talarmo | 379/59 |
| 5,719,918 A | | 2/1998 | Serbetciouglu et al. | 379/58 |
| 6,014,429 A | * | 1/2000 | LaPorta et al. | 379/88.15 |

FOREIGN PATENT DOCUMENTS

| EP | 0 825 790 A2 | 2/1998 |
|---|---|---|
| WO | WO 95/26113 | 9/1995 |
| WO | 0828355 A2 | 3/1998 |

OTHER PUBLICATIONS

PCT/SE 99/02001; Completed Jul. 21, 2000.
Standard Search Report for RS 102249 US Completed on Apr. 15, 1999, Apr. 23, 1999, EPO.
RCR Standard Specification—RCR STD 27, pp. 93–95; 188–189, 259, 271–273, 785–789.
Michel Mouly and Marie–Bernadette Pautet, "GSM—The Global System for Mobile Communications", 1992, Cell & Sys. Correspondence, Mercer Island, WA, U.S.A. XP002099930, 235920, pp. 56–59, 191–193, 206–212, 270–272, 280–281, 301–305, 379–384, 507–210, 556–563.
Andrew S. Tanenbaum, "Computer Networks", 1993, Prentice–Hall International Editions, Englewood Cliffs, U.S. XP002099931, 196050, pp. 337–345.

* cited by examiner

Primary Examiner—Lee Nguyen
Assistant Examiner—Philip J. Sobutka
(74) Attorney, Agent, or Firm—Jenkens & Gilchrist, PC (57) ABSTRACT

A relatively large short message (BC-SMS) is broadcast to a selected group of mobile subscriber stations within a cellular radio system. Each BC-SMS message greater in size than a predetermined number of octets is divided into segments, formatted into a separate modified paging message (PBC) which is unrecognizable to existing mobiles but recognizable to new mobiles. The BC-SMS message segments are broadcast in sequence as modified paging messages to the mobiles within the region of the system where the selected group is believed to be operating. Each paging message includes the essential elements of a paging message, a message ID number, a sequence number and the message segment payload.

24 Claims, 3 Drawing Sheets

METHOD AND SYSTEM FOR BROADCASTING LARGE SHORT MESSAGES

BACKGROUND OF THE INVENTION

1. Field of the Invention

The present invention relates to cellular radio systems and, more particularly, to the broadcast of relatively large short messages to selected groups of subscribers within such systems.

2. Description of the Related Art

Digital cellular radio communication systems have been introduced to virtually every part of the world and have experienced enormous growth over the last several years. Such systems are used not only for carrying voice traffic to and from the cellular radio subscribers of the system but also for data traffic such as electronic mail. Both voice and data traffic within a cellular radio system are conventionally point-to-point; that is, they are directed to or from a specific subscriber station operating within the network. However, the use of cellular radio systems for non-voice communication, i.e. data, is currently one of the fastest growing segments of this market.

Another communications function which has long existed in cellular radio systems is that of short message service (SMS). This is a feature in which a text message may be addressed to a specific subscriber within the cellular radio network and sent first to a message center. As soon as that subscriber is available to receive communications on the network, the SMS message is routed from the message center to the specific subscriber and is displayed as a text message on that subscriber's terminal. Again, conventional SMS messages are also point-to-point in the sense that they are addressed to a specific subscriber within the network and routed to that subscriber in the same way as a voice call.

A new functionality which is desirable to incorporate into a cellular radio system is that of the simultaneous broadcast of short messages (BC-SMS) to a selected group comprising a plurality of subscribers. For example, it might be of interest to supply certain items of textual information simultaneously to a number of cellular subscribers who are members of a particular news group and operating within a particular region of the cellular network. Another example might be the use of BC-SMS facilities to broadcast a textual description of the proceedings of a football match to all the cellular subscribers currently in the immediate vicinity of the football stadium where the match is taking place.

The use of conventional SMS technology to implement BC-SMS functionality would be prohibitive in terms of cellular system resources. If a large BC-SMS message was sent into the network for simultaneous delivery to many different specifically addressed subscriber stations, the load could be prohibitive not only on the traffic channels of the system but also on the central processing unit (CPU) of the mobile switching center (MSC) controlling that portion of the cellular system. The larger in size the message is, the greater the load on the network will be.

One possible solution to the lack of system resources to implement BC-SMS messages via conventional point-to-point communication to a large number of cellular subscribers is the use of a shared channel of the system, such as a broadcast or paging channel, to broadcast the messages to all subscribers simultaneously. A drawback to a proposal to use a broadcast channel is that if a broadcast channel is allocated with sufficient capacity to handle maximum length BC-SMS messages, there will be a great deal of wasted bandwidth when no messages are sent. A drawback to a proposal to use the paging channel is that paging messages are all of a specifically defined structure and must be limited in length to avoid inhibiting the paging functionability. The BC-SMS messages contemplated in the present invention may be significantly longer than the paging messages normally sent on the paging channel and hence it would not be possible to send them by simply substituting a BC-SMS message for a paging message. Additionally, the paging channel is a critical element of the cellular system operation and uncontrolled displacement of its function by a significant number of long BC-SMS messages would result in decreased performance of the system in its ability to locate mobiles for conventional voice calls to the mobiles.

The method and system of the present invention provides a solution to these problems and enables BC-SMS messages to be implemented in an orderly and a efficient manner within a cellular radio communication system.

BRIEF SUMMARY OF THE INVENTION

In one aspect, the present invention includes broadcasting short messages to selected groups of mobile subscribers within a cellular radio system. The message to be broadcast is organized into a broadcast protocol having a recipient group address, message identification indicia and message contents and then broadcast on a shared broadcast resource of the cellular system. The organized broadcast message is recognized at the selected groups of subscriber stations within a selected portion of the cellular system. The paging channel of selected radio base stations within the cellular system in the geographic area within which members of the selected groups of mobile stations are believed to be present is used to broadcast the message.

In another aspect, the present invention includes a protocol structure for a paging message (PBC) to be broadcast on the paging channel of a radio base station of a cellular radio system. The PBC messages carry a relatively large short broadcast message (BC-SMS) to be broadcast to a selected group of mobile subscriber stations operating within the system after separating the BC-SMS message into a plurality of smaller segments. The structure of the protocol includes the essential elements of a conventional paging message which are necessary in order to identify the PBC message as such to a particular category of mobile subscriber stations within the system, a broadcast group address identifying the mobile subscribers for which the BC-SMS message is intended, a message ID number identifying the BC-SMS message within the system, a message segment number for each of the separate segments into which the BC-SMS message is separated for identifying each particular segment of the message to be broadcast on each paging message, and the message contents of the message segment to be broadcast. The conventional paging message is modified to be unrecognizable to a first group of mobiles but recognizable to a second group which includes the particular category of mobile stations for which the PBC message is intended.

In yet another aspect, the present invention includes broadcasting short messages to selected groups of mobile subscribers within a cellular radio system by composing at a message source a short message to be broadcast (BC-SMS). The BC-SMS message has a broadcast group address comprising a geographical part identifying the geographical region of the cellular system to which the message is directed and a function group part identifying the particular selected groups of mobile subscriber stations to which the BC-SMS is to be delivered. The BC-SMS message information is forwarded from the message originator to a message center within the cellular system where it is organized into a message in accordance with the invention and then sent from the message center to the mobile switching center (MSC) of the system associated with the geographic part of the BC-SMS message broadcast group address. The organization of the message within the message center includes determining whether the size of the BC-SMS message to be broadcast is greater than a predetermined number of octets. If so, the BC-SMS message to be broadcast is separated into a plurality of separate segments, each segment to be separately broadcast as a paging message on a radio base station of the system. A sequence of paging messages (PBC) is formatted with each having the following parts: a broadcast group address identifying the mobile subscribers for which the message is intended; a message ID number identifying the message within the system; a message segment number for each of the separate segments into which the message is separated and identifying each particular segment of the message to be broadcast on each paging message; and the message contents of the message segment to be broadcast. The PBC messages carrying said BC-SMS message are sent from the message center to the MSC associated with the geographic part of the address. The MSC then sends the PBC message to all of the base stations in the area associated with the address and they are sequentially broadcast from all radio base stations within the area of the cellular system along with ordinary PBC messages in accordance with a priority determined to ensure that the paging functionality of said system is not seriously adversely affected.

BRIEF DESCRIPTION OF THE DRAWINGS

For an understanding of the present invention and for further objects and advantages thereof, reference can now be had to the following description, taken in conjunction with the accompanying drawings in which.

DETAILED DESCRIPTION OF THE PREFERRED EMBODIMENT

Figure 1:
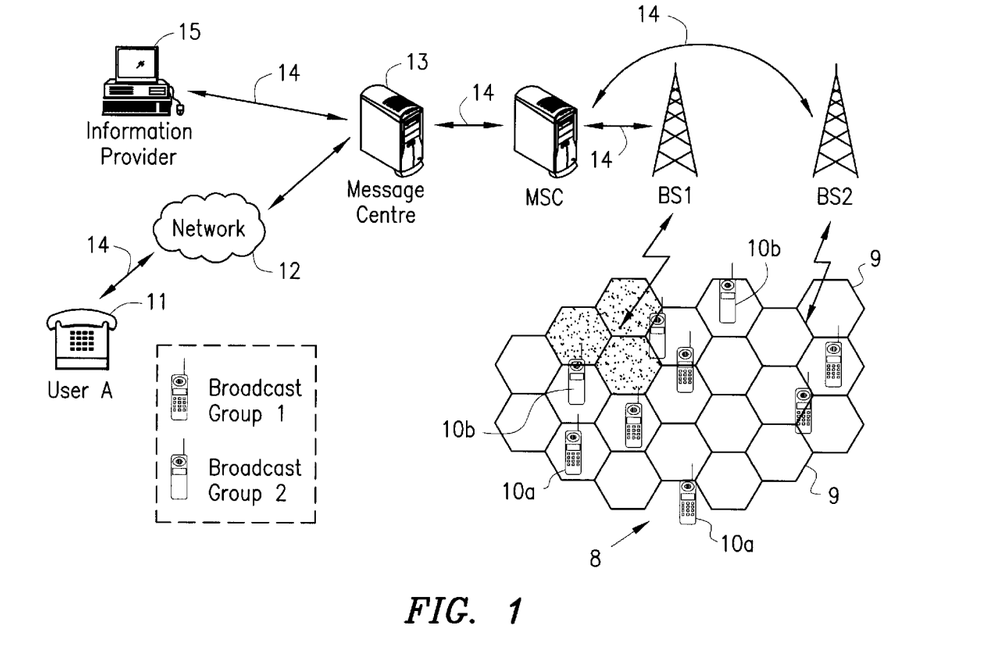
FIG. 1 is a block diagram illustrating the implementation of BC-SMS service in accordance with the present invention in a cellular radio communication system.

Referring first to FIG. 1, there is shown an illustration of a cellular radio system 8 having a plurality of cells 9 within which mobile subscriber stations 10a–10b are operating The mobile stations are being served within the system by plurality of base transceiver stations illustratively represented by BS1 and BS2. The system is being controlled by a mobile switching center (MSC).

The mobile stations 10a represent mobile subscribers who all belong to a particular broadcast group (group 1) which may represent the members of a first news group, for example. Similarly, the mobile stations 10b are all members of a different broadcast group (group 2) illustratively a second news group which subscribes to different subject matter than that of group 1. Information in the form of relatively long short messages which are intended for communication by broadcast to a plurality of different subscribers within the cellular radio system can be originated by a number of different sources. For example, a single user a might generate such messages from a conventional wireline subscriber terminal 11 and communicate that message to be broadcast via bidirectional communications channels 14 through a network 12 to a message center (SMS-C) 13. Similarly, an information provider 14, such as a conventional information or news provider, might similarly communicate messages to be broadcast to the message center 13. Communication channels 14 are bilateral which allow signaling between the respective elements of the system. The message sources such as User-A 11 and Information Provider 14 submit BC-SMS messages to the message center 13 which are eventually sent through the MSC and the base stations BS1 and BS2 to the addressed broadcast group within the system. The BC-SMS messages may comprise text, images, audio, video or any other format of message capable of being digitally represented.

The system of the present invention employs the paging channel of the cellular radio system to communicate the BC-SMS messages to the intended broadcast recipients within the system. Because of the size limitations on messages sent over the paging channel, the BC-SMS messages may be broken into two or more segments in accordance with a messaging protocol which facilitates reassembly of the segments of a message by the receiving mobile subscriber stations. In addition, the broadcast of the BC-SMS message segments over the paging channel is prioritized at a lower level than the conventional paging messages within the system to ensure that BC-SMS broadcasts do not significantly degrade the efficient operation of the cellular system in the completion of calls to its subscribers.

When one of the BC-SMS originators such as User-A 11 or Information Provider 14 submits a BC-SMS message it is sent to the message center 13 in a conventional manner. However, along with the BC-SMS message itself there is sent a broadcast group address for which the BC-SMS message is intended such as a particular news group, illustratively represented by either broadcast group 1 or broadcast group 2. The actual broadcast group address sent with the BC-SMS message contains two parts: a geographical part and a function group part. The geographical part of the broadcast group address is only used for the routing of the BC-SMS message to the appropriate MSC and base station (BS) within the system and is not sent over the air interface. The message center 13 receives a BC-SMS message from the submitting party and stores it temporarily within its memory. If the BC-SMS message contains more than a predetermined limited number of octets of data the BC-SMS message is split into a plurality of segments, each of which is less than the predetermined number of octets in size. The message center 13 then sends the BC-SMS message to the MSC associated with its particular broadcast group address, that is, the geographical part of the broadcast group address contained within the message. Each segment is then sent by the MSC as separate paging messages (PBC) on the paging channel. The MSC also masks out the geographic part of the broadcast group prior to the forwarding of the message segment onto the base stations for transmission.

Figure 2:
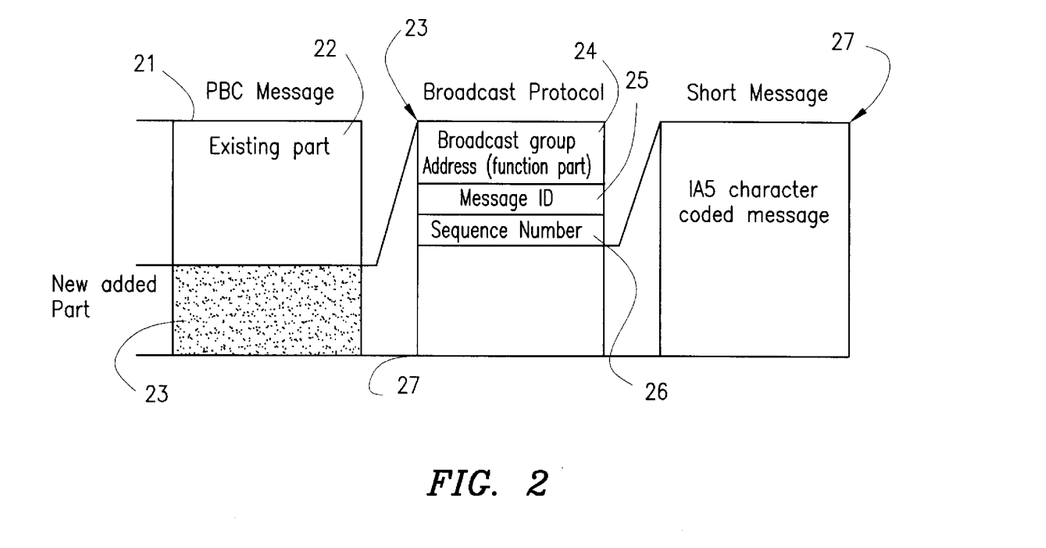
FIG. 2 is a pictorial diagram illustrating the overall structure of the BC-SMS messages in accordance with the present invention.

Referring next to FIG. 2, there is shown a pictorial diagram showing illustrative details of a paging message within a cellular radio system and the protocol with which the BC-SMS messages may be incorporated into it. The particular example of the PBC message structure shown is illustratively taken from the RT-message PAGING utilized in the Japanese mobile telephony standard (PDC) but the paging messages of other standards could be similarly employed.

In general, the existing paging message must be modified and adapted for use within the present invention so that some of the message element patterns are unrecognizable to the existing mobiles within the system and hence they will discard it as unrecognizable. However, the format of such modified message element patterns is programmed into new mobiles so that they will in turn receive and recognize the paging message as a large short message coming into that mobile. While the present modifications to existing paging messages in accordance with the invention can be made in numerous digital standards, the standard chosen for the present example of the invention is the Personal Digital Cellular (PDC) standard defined in the telecommunications system ARIB standard (RCR standard version 27F) dated Feb. 18, 1997 by the Association of Radio Industries & Business, Tokyo, Japan, which is hereby specifically incorporated by reference herein. More particularly, the paging message in the PDC System described in RCR Std-27F chapters 4.3.5.2.2 may be illustratively modified as follows: (a) the mobile station identity is set to group MSI (all ones); and (b) the number of paging mobile stations (MS) is set to 0. The part of the paging message which follows these fields is used to transfer the short message. The short message part of one paging message is, in this embodiment, restricted a maximum of 34 octets, depending upon the number of octets (either 7, 8 or 9, depending on whether the MSI and/or the ID field octets must be included) of supporting information which must be sent. Such a modified paging message is referred to herein as a PBC message (herein defined as on the Paging channel transferred BroadCast message).

In general, there is no need to define a new message in the exemplary RC Std-27F standard. Existing mobiles will not be affected since they will not recognize the modified message and will, thus discard it, and only mobiles that know how to interpret the modified paging message will recognize the short message. There are no special network resources needed for implementation only additions to the existing resources. The system load in this function is therefore readily kept to a minimum value.

Referring again to FIG. 2, a PBC message 21 of a predefined length includes a required existing part 22 necessary to define the message itself, modified as discussed above, for example, as well the information necessary to indicate to a specific universe of mobile subscriber stations that they should listen to and recognize the message. The first part 22 of a conventional paging message is ordinarily followed by an additional portion of the message which defines the particular mobile station which is being paged within the system and gives it instructions to respond to the system so that a conventional point-to-point call may be completed by the system to that particular mobile station. In the broadcasting of large short messages in accordance with the present invention, messages are broadcast on the paging channel which consist only of the necessary existing part 22 as modified in accordance with the invention and a newly added part 23 comprising the several elements of the BC-SMS message segment. This newly added part 23 is structured in accordance with a broadcast protocol consisting of the function group portion 24 of the broadcast group address sent by the original message sender and not the geographical part of the address which was only necessary to route the message to the appropriate MSC. In addition, the protocol includes a message ID 25 identifying the particular BC-SMS message within the system and a sequence number 26 identifying the particular segment of the BC-SMS message being sent in this particular PBC message. The final part of the broadcast protocol of the BC-SMS message is the character coded message segment itself 27 comprising the portion of the BC-SMS message being sent within the resources of a paging message. This illustratively may include an IA5 character coded message 27 which is broadcast simultaneously to all mobile stations in the area and recognized by only a plurality of different mobile stations which are each members of the particular broadcast group identified by the function group part address 24 in the PBC message 21. Each of these mobile stations receive and recombine this segment with the other segments which are broadcast on subsequent PBC messages.

The broadcast group address, that is the functional part sending the PBC message, is used to define different user groups within the subscribers in the system. For example, user groups such as broadcast group 1 and broadcast group 2 shown in FIG. 2 could illustrate the members of a particular news group who subscribe to a particular defined selection of news to be periodically broadcast to them. The functional part of the broadcast group address enables broadcast of the BC-SMS messages to be addressed to only the users within that particular group. A member of that group will recognize the functional part of the broadcast group address and receive the short message segment. The message ID element 25 is used in order to identify the particular BC-SMS message. Each short BC-SMS message has its own unique message ID number within the system. The sequence number 26 is used to link together each of the individual segments belonging to the same BC-SMS message and having the same message ID. A large message is segmented and each segment has a separate sequence number but each segment has the same message ID number. In order to identify the last segment of a message, a "last segment" indicator bit is set within the message protocol. It should also be noted that the number of bits used for each segment in the broadcast protocol of the BC-SMS message in accordance with the present invention is up to the specific implementation of an individual supplier.

Figure 3:
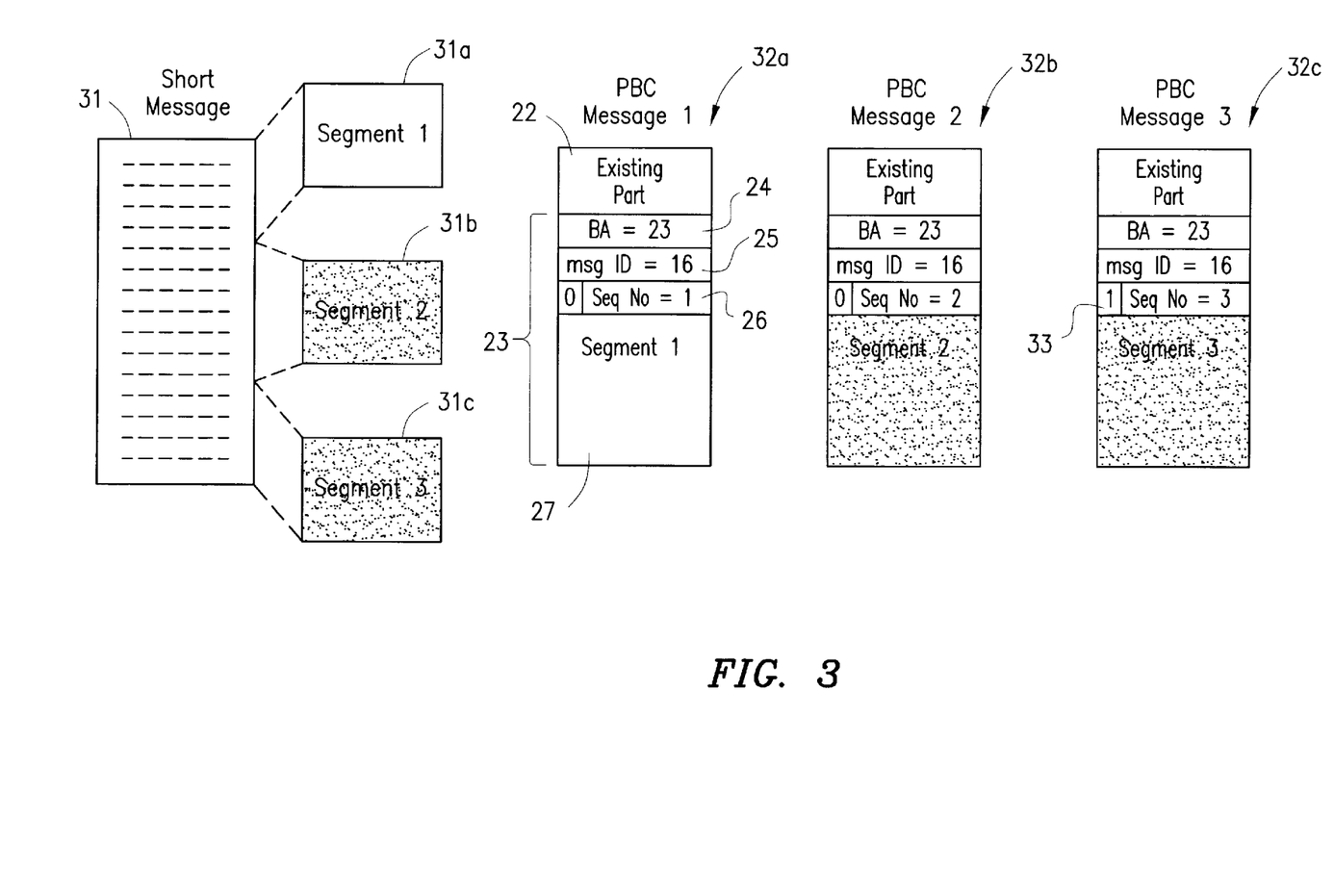
FIG. 3 is a pictorial diagram illustrating the manner in which the BC-SMS messages of the present invention are segmented to allow efficient delivery.

Referring next to FIG. 3, there is shown an example wherein a BC-SMS message is segmented and put into three separate PBC messages for communication to the intended recipients. In FIG. 3, the BC-SMS message 31 is divided into a first segment 31a, second segment 31b and a third segment 31c. The three successive PBC messages are used to transmit the BC-SMS message 31 and are shown at 32a–32c. Each of the paging messages 32a–32c carrying a segment of the short message 31 comprise an existing part of the paging message 22, as pointed out above as comprising the necessary part of the paging message structure itself, as well as the newly added parts 23. The newly added portion of the PBC message includes the functional part of the broadcast group address 24. In this instance the broadcast group address is shown to be BA=23. In addition, the message identification 25 is shown to comprise a message ID=16. The sequence number portion of paging message 32a is shown to comprise SEQ NO.=1. Finally, the remaining portion of the paging message is the data portion of the BC-SMS message 27. Each of the other paging messages 32b–32c are similar in structure but carry sequence numbers 2 and 3, respectively, to identify to the mobile station their order of reassembly to complete the entire BC-SMS message. It should also be noted that the most significant bit of the sequence number in paging messages 32a and 32b each comprise 0 while the most significant bit of the sequence number of paging message 32c is set to 1 (illustrated at 33) to indicate to the mobile stations that this is the last message in the sequence and hence it may now be reassembled in its entirety for the user of the mobile subscriber terminal.

As can be seen from FIGS. 2 and 3, a large short message is often too long to fit into a single paging message of a cellular radio system. Therefore, the message is split into a plurality of segments and the size of each segment is determined by how much space there is left in the PBC messages after inclusion of the required existing part 22 in order to structure the paging message itself One segment of the BC-SMS message is included in each one of the PBC messages.

Figure 4:
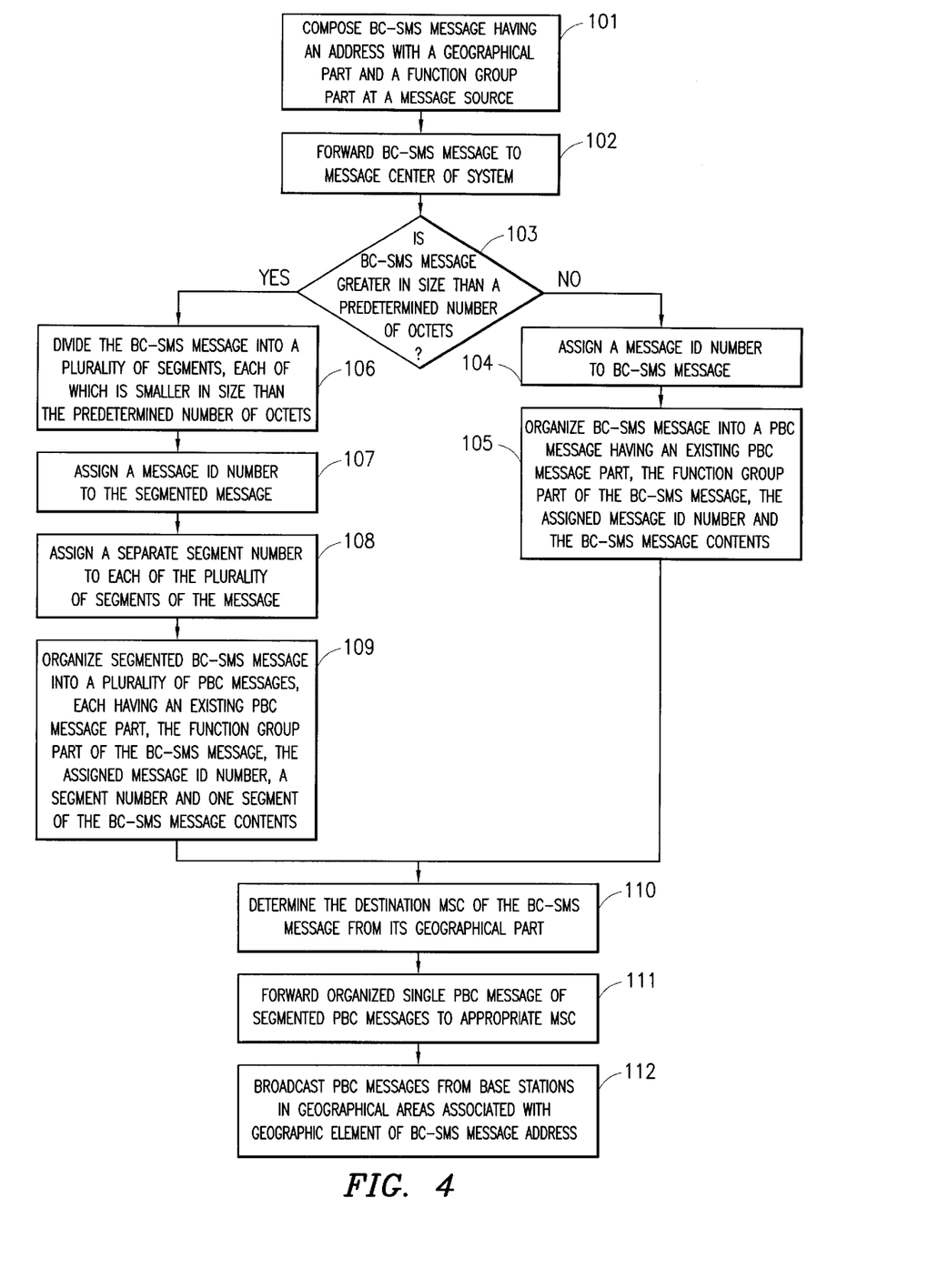
FIG. 4 is a flow chart illustrating certain aspects of the functionality of the present invention.

Referring next to FIG. 4, there is shown a flow chart depicting the sequence of steps involved in practicing one aspect of the method of the present invention. At 101 BC-SMS message information is composed by one of the message sources. This BC-SMS message information includes a two part message address comprising a geographical part, used for routing the BC-SMS message to the appropriate MSC and base station (BS), and a function group part identifying the particular broadcast group of mobile stations to which the message is directed. At 102 the composite message information is forwarded by the message source to a message center located within the cellular system network. At 103 the message information is analyzed at the message center and it is determined whether or not the content of the BC-SMS message would be greater in size than a predetermined number of octets. This predetermined number of octets is determined by the size of the paging messages being used within the cellular system. If, at 103, it is determined that the BC-SMS message would be smaller than the predetermined number of octets, the system simply assigns a message ID number to the BC-SMS message at 104 and then organizes a PBC message into a particular format at 105. This format comprises the existing part of a PBC message followed by the function group part of the PBC-SMS address, a message ID number and the BC-SMS message data content.

If, it is determined at 103 that the BC-SMS message is greater in size than a predetermined number of octets, the system moves to 106 at which the BC-SMS message is divided into a plurality of segments each of which is smaller in size than the predetermined number of octets. At 107 the system assigns a message ID number to the BC-SMS message and then moves to 108 at which each of the segments into which the message has been divided are assigned a separate segment number for handling and later identification. At 109 the system organizes a plurality of PBC messages each comprising the existing part of a paging message followed by the functional group part of BC-SMS address, the message ID, a segment number and one segment of the BC-SMS message data.

Thereafter, the system moves to 110 where it determines the destination MSC in accordance with the geographic element of the BC-SMS message. At 111 either the composite PBC message assembled at 105 or the series of PBC message segments organized at 109, are forwarded to the appropriate MSC. Finally, at 112 either the single organized PBC message is broadcast or the segments thereof are sequentially broadcast from the radio base stations in the geographic areas associated with the geographic element of the BC-SMS message address. All mobile stations within the area associated with the geographical element of the address receive the message, but only those associated with the function part of the address recognize the BC-SMS message and either display it for the user or store it for future access by the user.

While it has been shown in FIG. 4 and described herein that messages larger than a predetermined member of octets are segmented and organized in the message center, it should be understood that such segmentation and organization may take place in the MSC after it receives a numbered message from the message center.

As can be seen from the above description of the method and system of the present invention, the broadcast of large short messages via a common resource of all the subscribers in the cellular radio system, such as the paging channel, is implemented without adding significant loading of the resources of the system or degrading the efficient operation of the system in the conventional manner to complete point-to-point voice or data calls.

Although preferred embodiments of the method and apparatus of the present invention have been illustrated in the accompanying drawings and described in the foregoing description, it is understood that the invention is not limited to the embodiment(s) disclosed but is capable of numerous rearrangements, modifications and substitutions without departing from the spirit of the invention as set forth and defined in the following claims.

What is claimed is:

1. A method for broadcasting short messages to selected groups of mobile subscribers within a cellular radio system comprising:

organizing the message to be broadcast into a broadcast protocol having a recipient group address, message identification indicia and message contents;

separating said message to be broadcast into a plurality of separate segments;

sending said message from a message center to a mobile switching center (MSC) of the system associated with a geographic part of the BC-SMS message broadcast group address;

broadcasting, separately, each segment of said organized message along with ordinary PBC messages on a shared broadcast resource of the cellular system, said shared broadcast resource comprising the paging channel of selected radio base stations within the cellular system in the geographic area within which members of the selected groups of mobile stations are believed to be present; and receiving and recognizing said organized broadcast message at the selected groups of subscriber stations within a portion of the cellular system.

2. A method for broadcasting short messages to selected groups of mobile subscribers within a cellular radio system as set forth in claim 1 wherein the size of a short message to be broadcast is greater than a predetermined number of octets and said separating step further comprises:

separating said message into the following parts:

a broadcast group address identifying the mobile subscribers for which the message is intended;

a message ID number identifying the message within the system;

a message segment number for each of the separate segments into which the message is separated, identifying each particular segment of the message to be broadcast on each paging message; and the message contents of the message segment to be broadcast.

3. A method for broadcasting short messages to selected groups of mobile subscribers within a cellular radio system as set forth in claim 2 wherein:

said each paging message segment number includes indicia identifying whether that segment is the last segment of that particular message to be broadcast.

4. A method for broadcasting short messages to selected groups of mobile subscribers within a cellular radio system as set forth in claim 3 wherein:

said indicia identifying whether that segment is the last segment of that particular message to be broadcast includes the inclusion of either a 1 or 0 in the most significant bit position of said paging message segment number.

5. A method for broadcasting short messages to selected groups of mobile subscribers within a cellular radio system as set forth in claim 3 wherein:

each paging message to be broadcast also includes the essential elements of a conventional paging message in order to identify it as such to a particular category of mobile subscriber stations within the system.

6. A method for broadcasting short messages to selected groups of mobile subscribers within a cellular radio system as set forth in claim 1 wherein the message to be broadcast is originated at a message source and originally comprises:

a recipient address including a geographical part identifying the geographical region of the cellular system to which the message is directed and a broadcast group address identifying the particular group of mobile subscribers for which the message is intended within that geographic region; and the message contents of the message to be broadcast.

7. A method for broadcasting short messages to selected groups of mobile subscribers within a cellular radio system as set forth in claim 6 which includes the additional step prior to said organizing step:

sending said message from the message originator to a message center within said cellular system.

8. A method of broadcasting short messages to selected groups of mobile subscribers within a cellular radio system as set forth in claim 1 wherein the system paging message used to broadcast the organized message is modified to render it unrecognizable to the first group of mobile stations but recognizable to a second group of mobile stations.

9. A method of broadcasting short messages to selected groups of mobile subscribers within a cellular radio system as set forth in claim 8 wherein said selected group of mobile stations are included within said second group which recognize said modified paging message.

10. A method for broadcasting short messages to selected groups of mobile subscribers within a cellular radio system comprising:

composing a short message to be broadcast (BC-SMS) at a message source, said BC-SMS having a broadcast group address comprising a geographical part identifying the geographical region of the cellular system to which the message is directed and a function group part identifying the particular selected groups of mobile subscriber stations to which the BC-SMS is to be delivered;

forwarding the BC-SMS message from the message originator to a message center within the cellular system;

determining that the size of the BC-SMS message to be broadcast is greater than a predetermined number of octets, separating the BC-SMS message to be broadcast into a plurality of separate segments, each segment to be separately broadcast as a paging message on a radio base station of said system;

formatting a sequence of paging messages (PBC) each having the following parts:

a broadcast group address identifying the mobile subscribers for which the message is intended;

a message ID number identifying the message within the system;

a message segment number for each of the separate segments into which the message is separated, identifying each particular segment of the message to be broadcast on each paging message; and the message contents of the message segment to be broadcast;

sending the from the message center to the mobile switching center (MSC) of the system associated with the geographic part of the BC-SMS message broadcast group address; and sequentially broadcasting said PBC messages carrying said BC-SMS message from a radio base station within said cellular system along with ordinary PBC messages in accordance with a priority determined to ensure that the paging functionality of said system is not seriously adversely affected.

11. A system for broadcasting short messages to selected groups of mobile subscribers within a cellular radio system comprising:

means for organizing the message to be broadcast into a broadcast protocol having a recipient group address, message identification indicia and message contents;

means for separating said message to be broadcast into a plurality of separate segments;

means for sending said message from a message center to a mobile switching center (MSC) of the system associated with a geographic part of the BC-SMS message broadcast group address;

means for broadcasting, separately, each segment of said organized message along with ordinary PBC messages on a shared broadcast resource of the cellular system, said shared broadcast resource comprising the paging channel of selected radio base stations within the cellular system in the geographic area within which members of the selected groups of mobile stations are believed to be present; and means for receiving and recognizing said organized broadcast message at the selected groups of subscriber stations within a portion of the cellular system.

12. A system for broadcasting short messages to selected groups of mobile subscribers within a cellular radio system as set forth in claim 11 wherein the size of a short message to be broadcast is greater than a predetermined number of octets and said organizing means further comprises:

means for separating said message into the following parts:

a broadcast group address identifying the mobile subscribers for which the message is intended;

a message ID number identifying the message within the system;

a message segment number for each of the separate segments into which the message is separated, identifying each particular segment of the message to be broadcast on each paging message; and the message contents of the message segment to be broadcast.

13. A system for broadcasting short messages to selected groups of mobile subscribers within a cellular radio system as set forth in claim 12 wherein:

said each paging message segment number includes indicia identifying whether that segment is the last segment of that particular message to be broadcast.

14. A system for broadcasting short messages to selected groups of mobile subscribers within a cellular radio system as set forth in claim 13 wherein:

said indicia identifying whether that segment is the last segment of that particular message to be broadcast includes the inclusion of either a 1 or 0 in the most significant bit position of said paging message segment number.

15. A system for broadcasting short messages to selected groups of mobile subscribers within a cellular radio system as set forth in claim 13 wherein:

each paging message to be broadcast also includes the essential elements of a conventional paging message in order to identify it as such to a particular category of mobile subscriber stations within the system.

16. A system for broadcasting short messages to selected groups of mobile subscribers within a cellular radio system as set forth in claim 11 wherein the message to be broadcast is originated at a message source and originally comprises:

a recipient address including a geographical part identifying the geographical region of the cellular system to which the message is directed and a broadcast group address identifying the particular group of mobile subscribers for which the message is intended within that geographic region, and the message contents of the message to be broadcast.

17. A system for broadcasting short messages to selected groups of mobile subscribers within a cellular radio system as set forth in claim 16 which includes the additional means:

means for sending said message from the message originator to a message center within said cellular system.

18. A system for broadcasting short message to selected groups of mobile subscribers within a cellular radio system as set forth in claim 11 wherein the system paging message used to broadcast the organized message is modified to render it unrecognizable to the first group of mobile stations but recognizable to a second group of mobile stations.

19. A system for broadcasting short messages to selected groups of mobile subscribers within a cellular radio system as set forth in claim 18 wherein said selected group of mobile stations are included within said second group which recognize said modified paging message.

20. A system for broadcasting short messages to selected groups of mobile subscribers within a cellular radio system comprising:

means for composing a short message to be broadcast (BC-SMS) at a message source, said BC-SMS having a broadcast group address comprising a geographical part identifying the geographical region of the cellular system to which the message is directed and a function group part identifying the particular selected groups of mobile subscriber stations to which the BC-SMS is to be delivered;

means for forwarding the BC-SMS message from the message originator to a message center within the cellular system;

means for determining that the size of the BC-SMS message to be broadcast is greater than a predetermined number of octets;

means for separating the BC-SMS message to be broadcast into a plurality of separate segments, each segment to be separately broadcast as a paging message on a radio base station of said system;

means for formatting a sequence of paging messages (PBC) each having the following parts:

a broadcast group address identifying the mobile subscribers for which the message is intended;

a message ID number identifying the message within the system;

a message segment number for each of the separate segments into which the message is separated, identifying each particular segment of the message to be broadcast on each paging message; and the message contents of the message segment to be broadcast;

means for sending the from the message center to the mobile switching center (MSC) of the system associated with the geographic part of the BC-SMS message broadcast group address; and means for sequentially broadcasting said PBC messages carrying said BC-SMS message from a radio base station within said cellular system along with ordinary PBC messages in accordance with a priority determined to ensure that the paging functionality of said system is not seriously adversely affected.

21. A protocol structure for a plurality of separate segments of a paging message (PBC) to be separately and geographically broadcast on the paging channel of a radio base station of a cellular radio system which PBC carries a relatively large short broadcast message (BC-SMS) to be broadcast to a selected group of mobile subscriber stations operating within said system, said structure comprising:

the essential elements of a conventional paging message which are necessary in order to identify the PBC message as such to a particular category of mobile subscriber stations within the system;

a broadcast group address identifying the mobile subscribers for which the BC-SMS message is intended;

a message ID number identifying the BC-SMS message within the system;

a message segment number for each of the separate segments into which the BC-SMS message is separated, identifying each particular segment of the message to be broadcast on each paging message; and at least one bit position within said message segment number the contents of which identifies whether that segment is the last segment in a series of PBC messages containing one entire BC-SMS message; and the message contents of the message segment to be broadcast.

22. A protocol structure for a paging message (PBC) to be broadcast on the paging channel of a radio base station of a cellular radio system as set forth in claim 21 wherein said conventional paging message is modified to render it unrecognizable to a first group of mobile stations but recognizable to a second group of mobile stations.

23. A protocol structure for a paging message (PBC) to be broadcast on the paging channel of a radio base station of a cellular radio system as set forth in claim 21 wherein said particular category of mobile subscriber stations within the system are included within said second group of mobile stations which recognize said modified paging message.

24. A protocol structure for a paging message (PBC) to be broadcast on the paging channel of a radio base station of a cellular radio system as set forth in claim 23 wherein said cellular radio system is operated in accordance with the PDC cellular standard and said paging message is modified to include a zero in the parameter defining the number of paged mobiles, a zero in the parameter indicating that the broadcast system information has changed and a zero in the parameter specifying the timing of the change in the BCCH information to render the modified message unrecognizable to existing mobile stations operating in accordance with the PDC system.

* * * * *